United States Patent Office 3,340,026
Patented Sept. 5, 1967

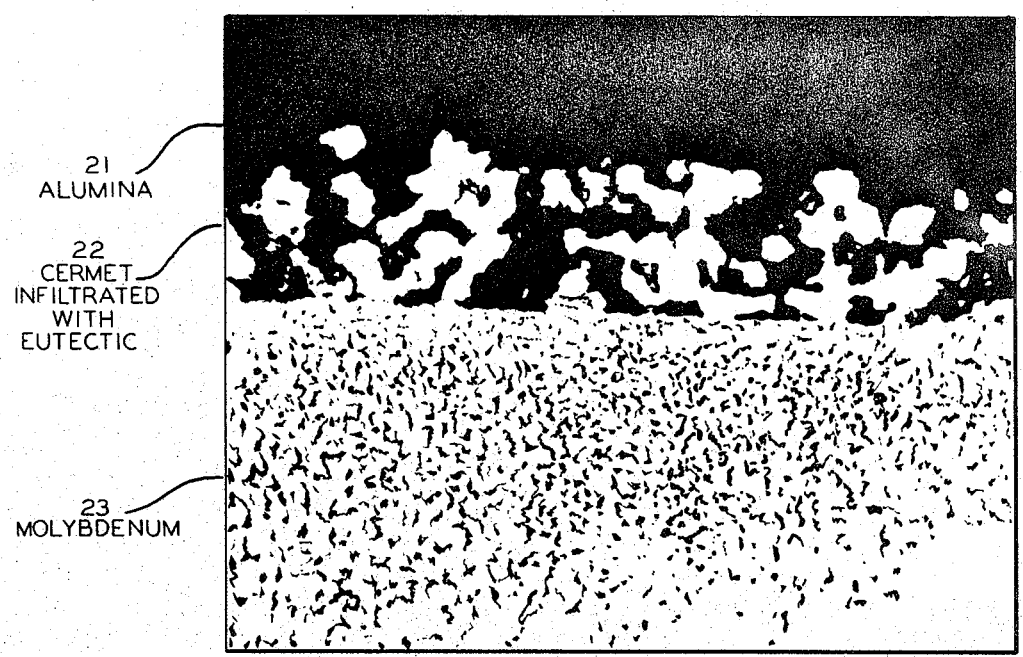

3,340,026
COMPOSITE ARTICLE OF BONDED REFRACTORY METAL AND A CERAMIC
Robert S. Kiwak, Dearborn Heights, Mich., assignor to The Bendix Corporation, a corporation of Delaware
Filed Dec. 3, 1964, Ser. No. 415,725
5 Claims. (Cl. 29—195)

ABSTRACT OF THE DISCLOSURE

A composite article consisting of a refractory metal such as molybdenum, and a refractory ceramic material, such as alumina which are bonded utilizing a eutectic of yttria and alumina. A bonding material consisting of a mixture of a powdered metal, such as molybdenum, alumina and yttria can also be used alone or in combination with the eutectic.

---

This invention pertains to the bonding of refractory materials and in particular, providing for hermetic sealing or bonding of a refractory material, such as a refractory metal or a refractory ceramic, wherein the melting point of the bonding material is in a range below that of the melting point of the refractory materials.

In the past, in order to hermetically bond refractory materials, such as refractory ceramics and metals, the ceramic was coated with a metallizing slurry, composed of finely ground powders of a refractory metal such as molybdenum and a fluxing material such as manganese, titanium, silica, etc. The ceramic was then fired at a high temperature in wet hydrogen to form an adherent metallized coating. The metallized ceramic surface was brazed or soldered to the metal surface to effect a hermetic metal-to-ceramic seal. The major disadvantage of this method was that the melting point of the braze or solder was in the area of 1000° C. thereby limiting if not preventing the use of the refractory materials for applications in devices such as thermionic converters. Also, such bonds were subject to corrosion by cesium, were brittle, and were difficult to make into hermetic seals.

This invention provides an improved hermetic bond by using a significantly improved non-porous bonding material which may be a eutectic of yttria and alumina. One of the eutectics of yttria and alumina has a melting point of about 1760° C. which is lower than the melting temperatures of either yttria or alumina and is in a range below that for the melting temperatures of the refractory metals such as molybdenum, columbium, tantalum and tungsten. This, then, provides a bond which is hermetic and which can withstand very high temperatures making it more useful and increasing its applications.

This invention also provides an improved cermet material, which for the purpose of this description is composed of a refractory ceramic and a metal, which has a higher melting point, is more chemically resistant, and provides a more attractive appearance than the previous cermet or metallizing materials.

In the drawing is shown a magnified cross sectional view of a bond between two refractory materials. Alumina 21 is shown as the ceramic layer and is bonded to a cermet layer 22, which is comprised of an alumina powder, an yttria powder and a refractory metal such as molybdenum, columbium, tantalum or tungsten fused as described below, which cermet layer 22 is infiltrated with a fused eutectic of alumina and yttria. Bonded to layer 22 is refractory metal layer 23 which in this embodiment is molybdenum. This bond is very strong mechanically, is hermetic, resistant to cesium and the lowest melting constituent melts at about 1760° C. so that it can be used in very high temperature applications. Following are methods to bond refractory materials such as refractory metal to a ceramic material.

First described method

In the first described preferred embodiment for bonding a ceramic such as alumina to a refractory metal such as molybdenum, a powder having 80 percent molybdenum by weight, 10 percent yttria by weight and 10 percent alumina by weight is mixed with water or a lacquer like carrier in a ball mill to produce a paint-like slurry. The size of the powder in this embodiment is —325 mesh but it can be made in any mesh size which will provide the covering properties desired and powders in the range of a —100 mesh and less have been found suitable. Any percentage composition and mesh which "wets" the surface of the ceramic and metal after being fused is satisfactory. A surface is wet when the angle between the material to be fused and the surface is greater than 90°.

The next step is to paint the slurry so prepared on the surface of the alumina. The alumina is then fired at 1800° C. for one-half hour to produce a metallized surface, which is porous, on the alumina. Another layer of the slurry is painted on the metallized surface to obtain greater thickness and then is also fired at 1800° C. for one-half hour.

The metallized surface of the alumina is then lapped to make it level and polished. Similarly, the molybdenum surface is lapped and polished.

The two polished surfaces are placed in intimate contact and fired at 1800° C. for one hour to produce a good mechanical bond between the surfaces.

A mixture of powders, 38 percent by weight of yttria and 62 percent by weight of alumina, forms a eutectic, or lowest melting point combination of these two substances, and is made in a ball mill with water added to produce a paint-like slurry. Again the mesh may be selected as desired and in this instance is —325.

The eutectic mixture is painted on the bonded joint between the alumina and molybdenum and fired at 1800° C. at which temperature it will infiltrate the pores of the porous cermet bond to make it air tight.

Second described method

In another preferred embodiment a slurry made in a ball mill from water and a —325 mesh powder mixture of 80 percent by weight of molybdenum, 10 percent by weight of yttria and 10 percent by weight of alumina is made to a paint-like consistency. Again the mesh may be selected to provide the coverage desired. The slurry is now painted on the molybdenum, rather than on the alumina, and is fired at 1800° C. for one-half hour to form a metallized surface on the molybdenum. The slurry may also be sprayed on or applied by dip coating.

A eutectic mixture in powder form, which in this embodiment is a —325 mesh, of 38 percent by weight of yttria and 62 percent by weight of alumina is prepared with water in a ball mill to form a paint-like slurry. This eutectic is painted on the porous metallized surface of the molybdenum and the alumina surface is then placed in intimate contact with the painted metallized surface of the molybdenum and while being held in such contact the surfaces are fired to 1800° C. for one minute to melt the eutectic and produce a good mechanical bond and an air tight seal. As an alternative, the alumina surface could be painted with the eutectic.

Third described method

As an alternative to this last mentioned method, the first coating of 80 percent molybdenum, 10 percent yttria, and 10 percent alumina may be omitted and instead the molybdenum or other refractory metal surface may be roughened, as by etching with a suitable metal etch, instead. A 70 percent concentration (specific gravity 1.42) of nitric acid with 18 grams per liter of $CrO_3$ may be used for the etch. This would mean that the eutectic mixture, similarily prepared, would be painted directly on the roughened metal surface or alumina instead of on the porous cermet surface and a hermetic bond will result after placing the alumina in intimate contact and firing at 1800° C. for one minute. However, the bond so produced while being satisfactory in compression and shear, is not as satifactory in tension as is the bond using the porous cermet metallized coating on the molybdenum or other refractory metal.

*Fourth described method*

A further preferred embodiment comprises the method of preparing a slurry in a ball mill of —325 mesh, or other suitable mesh, powder mixture of 80 percent of molybdenum by weight, 10 percent by weight of alumina and 10 percent by weight of yttria in a ball mill as described for the previous embodiments. The slurry is then painted on the ceramic surface, and fired to 1800° C. until it is fused thereon. The eutectic of alumina and yttria is prepared as described for the previous embodiments and painted on the porous cermet surface and is fired to 1800° C. until fused thereon. The fused eutectic is then lapped and polished as is the metal surface after which the two polished surfaces are placed in intimate contact and fired at 1800° C. until bonding is complete.

In the methods described in this invention, the 1800° C. is higher than the bonding mixture fusing points, including both the cermet and eutectic mixtures, but is lower than the melting temperature of the ceramic or the refractory metal.

*Fifth described method*

A further preferred embodiment comprises preparing a paint-like slurry of —325 mesh, or other suitable mesh, powders of 40 percent by weight of molybdenum, 24 percent by weight of yttria, and 36 percent by weight of alumina and this slurry is painted on the ceramic and fired to 1800° C. until it is fused thereon. This surface is then lapped and polished as is the metal surface and the polished surfaces are placed in intimate contact and held in such contact while being fired at 1800° C. until bonded.

By using the methods of this invention, alumina-to-alumina and yttria-to-yttria seals can be made. The eutectic can be used as an adhesive to bond the refractory metals to each other.

Seals for higher temperature service can be made between yttria and one of the refractory metals by using the yttria rich eutectic. The yttria-alumina phase diagram contains three eutectics.

When heating or firing is done in the embodiments of this invention it is preferably done in a protective atmosphere such as under substantially vacuum conditions.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described my invention, I claim:

1. A composite article comprising a refractory metal bonded to a ceramic material selected from the group of yttria and alumina, the bonding material being a eutectic of yttria and alumina.

2. A composite article according to claim 1 wherein a cermet layer comprised of an alumina powder, an yttria powder and a refractory metal is disposed between said eutectic and one of said refractory metal and said ceramic material.

3. A composite article according to claim 1 wherein said refractory metal is molybdenum and said ceramic material is alumina.

4. A composite article comprising a refractory metal selected from the group of molybdenum, columbium, tantalum and tungsten bonded to a refractory ceramic selected from the group of yttria and alumina, the bonding material consisting of a mixture of a metal selected from said group in an amount such that said metal constitutes from 40% to 80% of said bonding material, the balance of said bonding material being alumina and yttria in approximately equal proportions.

5. A composite article according to claim 4 wherein said refractory metal is molybdenum, said refractory ceramic is alumina and the metal in said mixture is molybdenum.

References Cited

UNITED STATES PATENTS

| | | | |
|---|---|---|---|
| 1,944,138 | 1/1934 | King | 189—36.5 X |
| 2,282,106 | 5/1942 | Underwood. | |
| 2,996,795 | 7/1961 | Stout | 29—191.2 X |
| 3,029,559 | 4/1962 | Treptow | 287—189.365 |
| 3,274,024 | 9/1966 | Hill | 117—200 |

OTHER REFERENCES

"Ceramic to Metal Sealing" by Jenkins published Electronic Engineering, July 1955, pp. 290–294.

HYLAND BIZOT, *Primary Examiner.*